May 22, 1956
W. W. DRUMMOND ET AL
2,746,118
APPARATUS FOR THE PACKAGING OF
CONTINUOUSLY PRODUCED STRANDS
Filed April 25, 1952
4 Sheets-Sheet 1
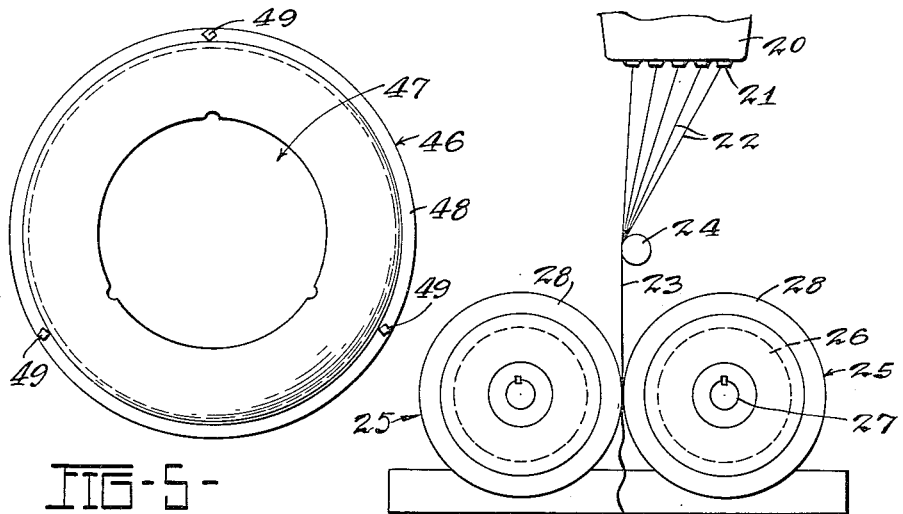
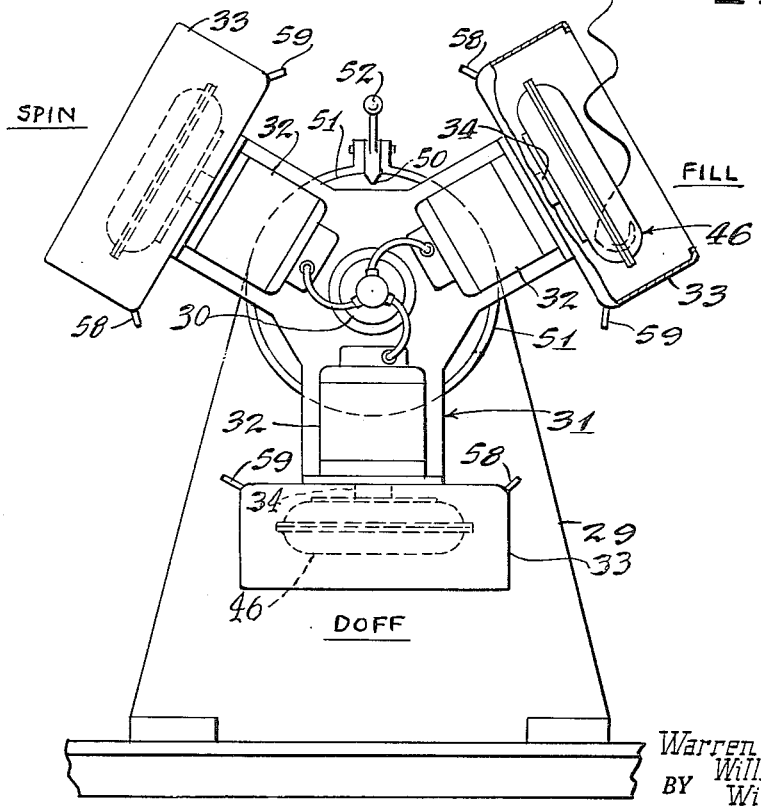
INVENTORS:
Warren Wendell Drummond,
William R. Steitz,
BY William P. Holtschulte.
ATTYS.

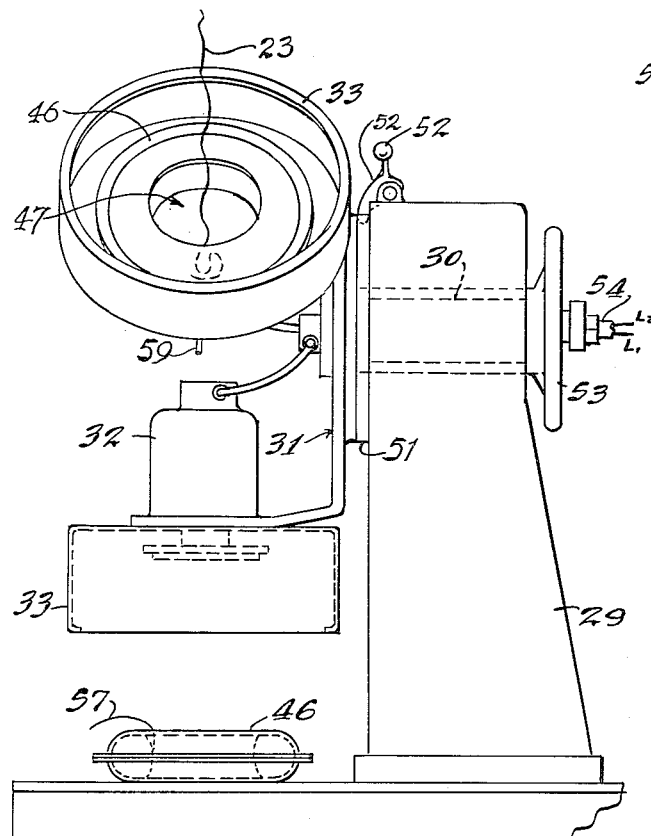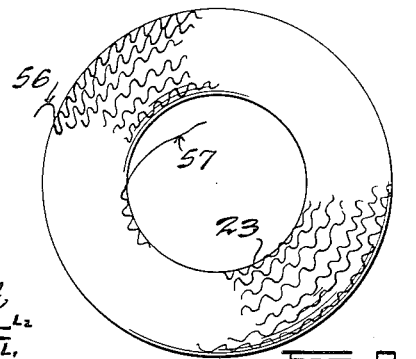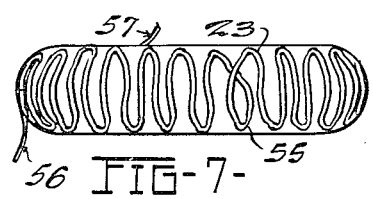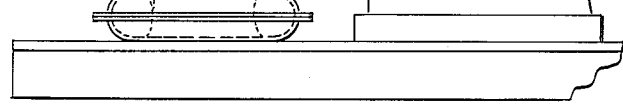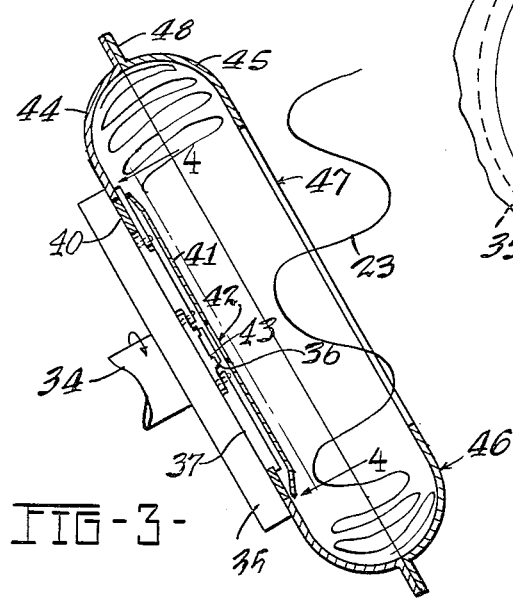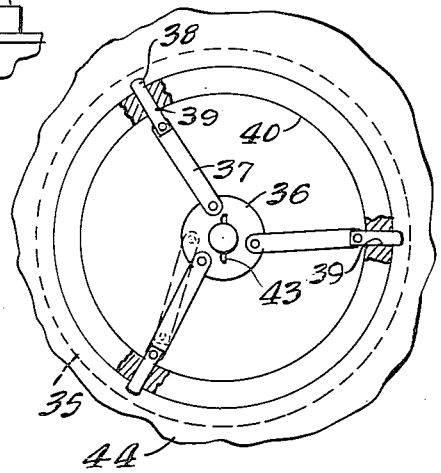

May 22, 1956
W. W. DRUMMOND ET AL
2,746,118
APPARATUS FOR THE PACKAGING OF
CONTINUOUSLY PRODUCED STRANDS
Filed April 25, 1952
4 Sheets-Sheet 3
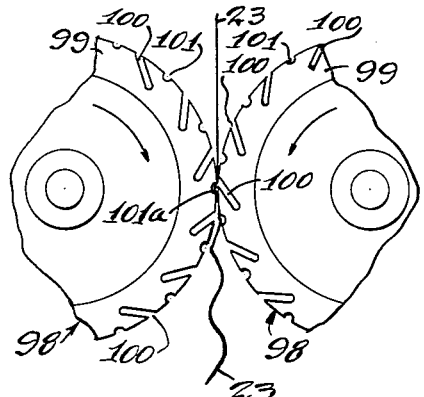
FIG-11-
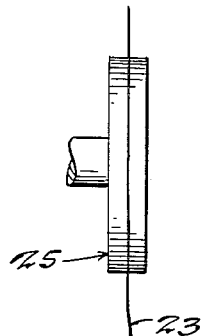
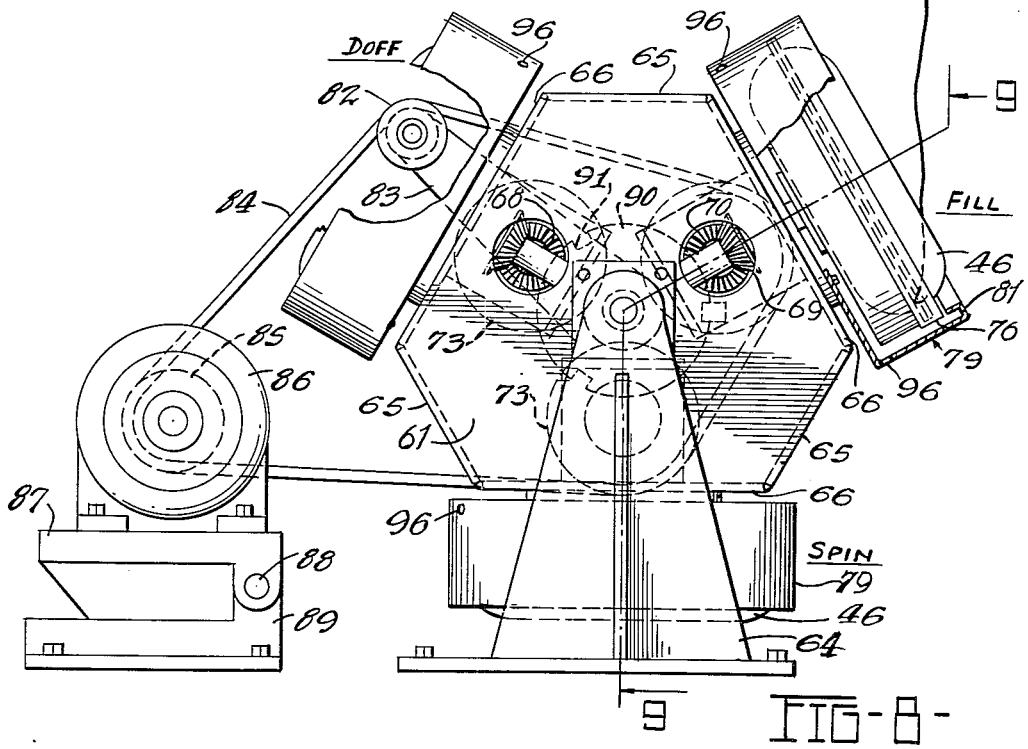
FIG-8-
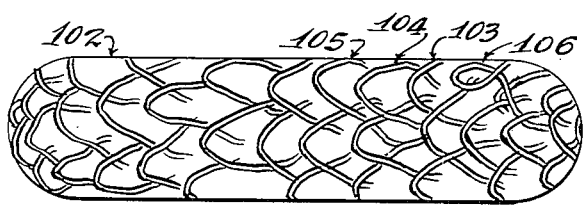
FIG-10-
INVENTORS:
Warren Wendell Drummond,
BY William R. Steitz,
William F. Holtschulte.
ATTYS.

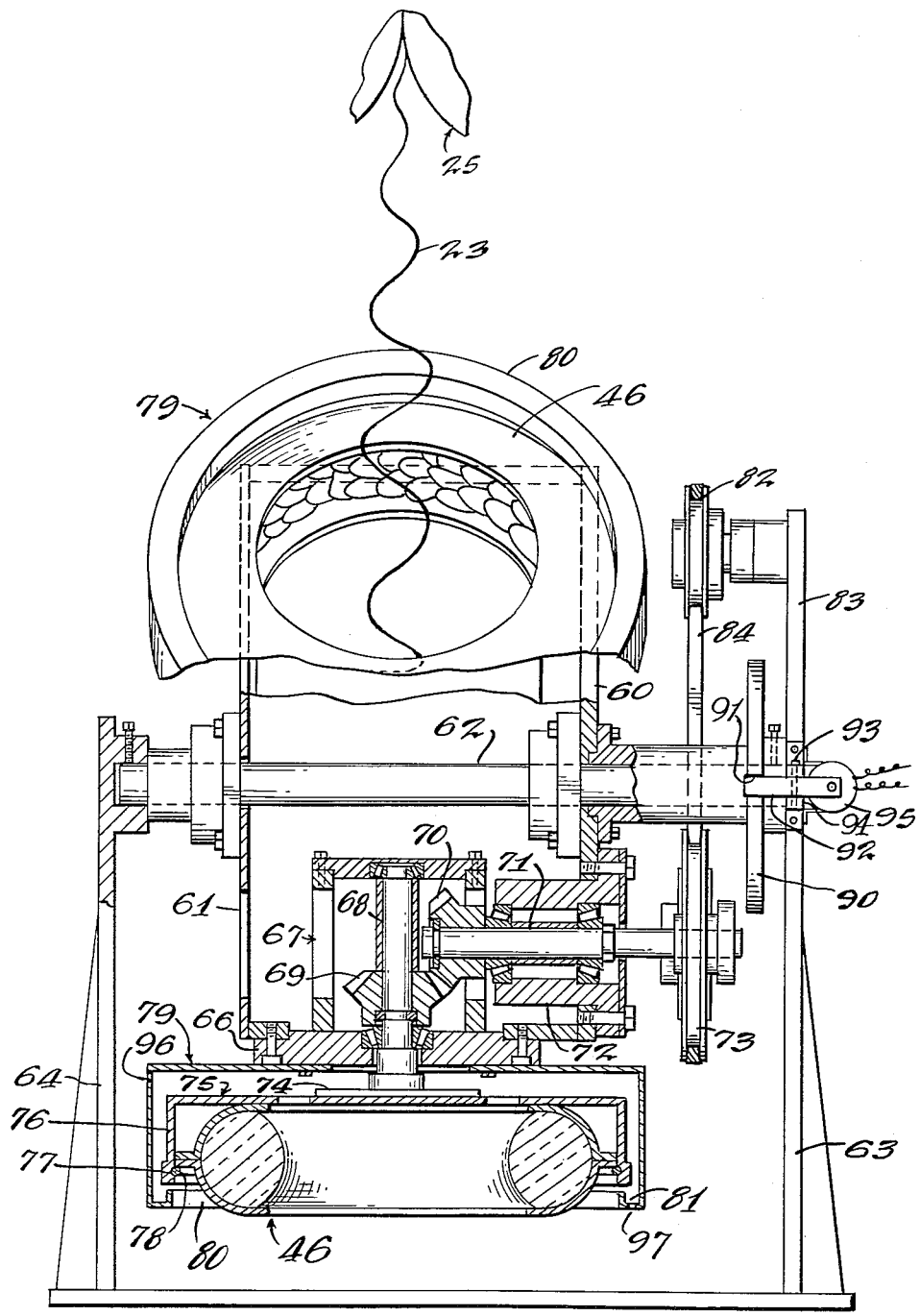
FIG-9-

United States Patent Office 2,746,118
Patented May 22, 1956

2,746,118

APPARATUS FOR THE PACKAGING OF CONTINU-
OUSLY PRODUCED STRANDS

Warren Wendell Drummond, William R. Steitz, and Wil-
liam F. Holtschulte, Newark, Ohio, assignors to Owens-
Corning Fiberglas Corporation, a corporation of Dela-
ware Application April 25, 1952, Serial No. 284,388

8 Claims. (Cl. 28—21)

This invention relates to the packaging of continuous strands and, more particularly, to apparatus for the packaging of continuously produced strands according to the process disclosed and claimed in copending Slayter application Serial No. 279,870, filed April 1, 1952, and now abandoned.

Continuously produced strands such as textile strands of rayon, nylon, various threads, glass fiber strands and others, for the most part have been packaged by winding upon high speed rotary spools or bobbins. Particularly in cases where the strand being packaged is produced at a higher linear speed or with considerable tension created by pulling the strand, the accumulating layers or turns of strand on a spool which is increasing in diameter as the strand accumulates thereon progressively increase the inwardly acting compressive force of the mass of strands.

This increasing compressive force has several disadvantageous results. Among them are the difficulty of supporting the tube or center portion of the spool to prevent its collapse as the tension of superposed loops of strands builds up, and the necessity for high speed oscillation of the package to build it up in even layers and, frequently, to direct contacting loops of strand at considerable angles to each other to prevent adhesion therebetween which would snag the strand during unwinding.

Even if the spool is made sturdy enough to withstand the increasing compressive force of the winding, successive turns of strand are forced inwardly between prior turns, resulting in snags and tangles during unwinding. No matter how carefully the strand is originally wound, the problem of snags and snarls or licking during subsequent unwinding of the strand remains severe.

Another disadvantage inherent in spool type or wound packages results from the fact that the mass of strand is accumulated on the exterior of the package and therefore is unprotected and is likely to be damaged during handling.

Where the strand being packaged is comprised of a multiplicity of fine parallel fibers, for example, a glass fiber strand which may have upwards of 200 or so individual filaments, it has heretofore been impossible to package the strand as produced in any form that will permit shipment without a preliminary step.

A glass fiber strand is generated at a speed of, say, 10,000 feet per minute. A winding tube or spool of sufficient size to be rotated to provide a peripheral speed of 10,000 feet per minute is too big to permit a very great quantity of strand to be accumulated without becoming too large to handle. If any commercially usable length of strand is to be accumulated, the strand must be wound many, many layers deep.

Where the filaments in the strand are as fine as in this case, any disturbance of the strand on the spool results in confusion between the filaments of adjacent turns of the strand. The increasing tension mixes the filaments of different turns. Finding a complete "end" on such a package is almost impossible. Any substantial amount of handling hopelessly mixes the strand turns because some of the loops fall off the spool, etc.

For these many reasons, commercial practice includes a rewinding and twisting step. The wound spools are placed in a twister immediately after they are wound and the strand is twisted (to give strand integrity) and rewound on second tubes or spools. The rewinding and twisting produces a package which is not subject to many of the ills enumerated above, but it is an expensive and time consuming solution to the problems.

Not only does the twisting step increase cost, but the "package," i. e., the spool, still must be relatively heavy and large in proportion to the strand wound on its exterior which increases the cost of shipping the strand as well as making the spool expensive enough to require its return to the strand fabricator. Since the spools must be of the same size in order to permit efficient operation, they cannot be nested and the cost of return of the spools also is high.

A further disadvantage inherent in a spool type package is the fact that the linear speed of the spool surface must be at least equal to the linear production rate of the strand.

It is the principal object of this invention to provide apparatus for the packaging of a continuous strand in a manner such that substantially all of the problems enumerated above are eliminated.

It is another object of this invention to provide apparatus for the packaging of a continuously produced strand in which the accumulation of the mass of strand in one package occurs concurrently with further treatment of a mass of strand in a previously filled package.

It is yet another object of this invention to provide apparatus for the packaging of a continuously produced strand by projecting said strand onto a moving surface which repeatedly passes the line of projection of the strand and thus building up the strand in superposed layers to accumulate a substantial mass of the strand in a relatively small volume.

It is yet another object of this invention to provide apparatus for accumulating a continuous strand in a plurality of superposed generally wave form layers and to compact the layers of strand together thereby to densify the mass of strand and permit the accumulation of a substantially great length of strand in a given volume.

It is also an object of this invention to provide an apparatus for carrying out the process disclosed and claimed in the above mentioned Slayter application and for producing a package such as that disclosed and claimed in copending Drummond, Steitz and Frickert application Serial No. 282,728, filed April 16, 1952.

The mode of accomplishing these objectives and various advantages accruing from apparatus embodying the invention will be more fully understood by reference to the specification which follows and to the drawings appended hereto, in which:

Fig. 1 is a front view in elevation of packaging apparatus embodying the invention.

Fig. 2 is a side view in elevation of the apparatus shown in Fig 1.

Fig. 3 is a vertical sectional view through a package of strand as accumulated upon apparatus embodying the invention.

Fig. 4 is a fragmentary view in elevation taken substantially from the position indicated by the line 4—4 of Fig. 3.

Fig. 5 is a plan view of a package to be filled upon apparatus embodying the invention.

Fig. 6 is a plan view of a mass of strands accumulated through the operation of apparatus embodying the invention.

Fig. 7 is a side view in elevation of the mass of strands shown in Fig. 6.

Fig. 8 is a side view in elevation of a modification of apparatus embodying the invention and illustrating the packaging of the strand in slightly modified form.

Fig. 9 is a vertical sectional view of the apparatus shown in Fig. 8 taken substantially on the line 9—9 of Fig. 8.

Fig. 10 is a view similar to Fig. 7 but of a package produced by the operation of the apparatus as shown in Figs. 8 and 9.

Fig. 11 is a fragmentary view in side elevation of a modified form of strand projection means included in mechanism embodying the invention.

For the purpose of illustrating the operation of apparatus embodying the invention, it will be described as employed for the packaging of continuous glass fiber strands. In the fabrication of a glass fiber strand, consisting of as many as, say, 200 individual glass fibers, the supply of glass is maintained in a tank 20 having a plurality of individual fiber orifices 21 through which fine glass streams flow to form individual glass fibers 22. The fibers 22 are gathered into a strand 23 by a gathering roller or similar means 24 and then fed downwardly between the bite of a pair of high speed pulling rollers 25. The pulling rollers 25 consist of hub sections 26 mounted upon parallel shafts 27 that are driven by a motor (not shown) and rim elements 28 between which the strand 23 is engaged.

The pulling rollers 25 are rotated at a speed appropriate to give the peripheral surfaces of the rims 28 a linear speed of about 10,000 feet per minute, which feeds the strand 23 at that speed thus attenuating the streams of glass pouring through the orifices 21 to form the fine individual fibers 22 which are loosely associated into a group in the strand 23.

In the structure shown in Fig. 1 the strand 23 is projected downwardly by the pulling rollers 25 across an open air space. As the strand 23 moves through the air it encounters substantial resistance to its passage which causes it to be progressively slowed and deflected into a wave form pattern of gradually increasing amplitude and decreasing wave length.

Located below and slightly to one side of the line of fall of the strand 23, a sturdy pedestal 29 is erected and rotatably mounts an arbor 30 (see also Fig. 2) on the forward end of which there is rigidly secured a three-arm spider 31. Each of the arms of the spider 31 supports an electric motor 32 with its axis extending along a line parallel to a radius of the spider 31 and arbor 30, and an open cylindrical guard 33. Each of the motors 32 has a shaft 34 which protrudes coaxially through the bottom of its associated guard 33.

At the end of each of the shafts 34 there is fixedly mounted a disk-like flange 35 (see Figs. 3 and 4). The flange 35 has a central depression in which there is located an oscillatable actuator 36 which is connected by a plurality of links 37 to a similar number of locking pins 38 that slide through radial slots 39 in an annular spacer 40 which is secured to the flange 35. A cover 41 (Fig. 3) may be mounted on the flange 35 to enclose the actuator 36 and links 37 and has a central aperature 42 through which an operator may insert a tool into a slot 43 in the actuator 36 to turn the same to withdraw and extend the pins 38.

The pins 38 are spaced from the surface of the flange 35 a distance equal to the thickness of the walls of a flanged ring 44 which, with a companion ring 45 is mated to form an annular package generally indicated by the number 46. The outside diameter of the annular spacer 40 matches the diameter of either of the axial openings 47 in the rings 44 and 45. Each of the rings 44 and 45 has a perimetrical flange 48 which are provided (see Fig. 5) with locking means 49 (see Fig. 5) to retain the two rings 44 and 45 together or, when disengaged, to permit their separation.

By turning the actuator 36, the pins 38 can be withdrawn into the annular spacer 40 and a package 46 can be placed upon or removed from the disk-like flange 35, being retained thereon when the pins 38 are extended to overlap the edge of that one of the rings 44 or 45 placed adjacent the flange 35.

The spider 31 is rotatable on the arbor 30 and is positioned with one of its three arms turned downwardly and the other two arms directed upwardly on an incline (the position shown in Figs. 1 and 2) by the engagement of a dog 50 with a notched positioning disk 51 that is rotatable with the spider 31 on the arbor 30. A hand knob 52 permits an operator to engage and disengage the dog 50 in the notches of the disk 51 at will.

A hand wheel 53 (see Fig. 2) is secured on the end of the arbor 30 opposite from the spider 31 and a power line 54 leads through the arbor 30 for conducting electricity to the motors 32. By moving the knob 52 and disengaging the dog 50 from the disk 51, the operator can then rotate the spider 31 by turning the hand wheel 53 until it has been rotated 120° and the dog 50 engages in another one of the notches in the disk 51.

The pedestal 29 is so positioned relative to the pulling rollers 25, and the arms of the spider 31 and shafts 34 of the motors 32 of such length, that in anyone of the three possible positions of the spider 31, one of the packages 46 will be located with one of its openings 47 inclined upwardly in position to receive the strand 23 as it is projected downwardly. The vertical distance between the pulling rollers 25 and the "Fill" position for the packages 46 is so calculated that the increasing amplitude, decreasing length, wave forms which are created in the strand by resistance to its passage through the air, reach an amplitude sufficient to extend substantially axially across the package 46 by the time they reach the lower side of the package 46 in "Fill" position. The angle at which the shafts 34 are tilted are so selected that the line of flight of the strand 23 intersects the opening 47 in the package 46 in such a manner as to allow the strand 23 to pass therethrough and impinge against the inner generally cylindrical surface of the annular package 46.

As mentioned, the strand 23 is projected by the pulling rollers 25 at a speed in the order of 10,000 feet per minute. As its momentum is overcome by air resistance and the strand piles up upon itself in the wave form pattern shown in the drawings, the linear speed of the wave form mass drops substantially below the linear speed of projection of the strand on the rollers 25. The package 46 which is in strand receiving or "Fill" position, therefore, need only be rotated so that its surface moves at a linear speed less than the linear speed of the projection of the strand by the rollers 25 so that the strand builds up upon the inner surface of the package 46 in generally wave form layers extending around the package and superposed one upon the other in generally spiral relationship.

Although by the time it strikes the package 46, the strand 23 has slowed down substantially, it still is travelling at a linear rate of, say, 5,000 feet per minute and thus the package 46 must be rotated at considerable speed so that the centrifugal force acting on each of the wave form layers of strand which is laid upon the inner surface of the package 46 or upon a previously laid layer, is sufficient to outwardly compact the layers, flattening any loops or swirls which might tend to bridge or arch, and densifying the mass of strands.

In Fig. 6 the mass of strands is shown in plan and in Fig. 7 in end elevation. In Fig. 7 the outside or first laid layer of strands is shown in greatly exaggerated dimension. It can be seen that while most of the wave forms of the layers of strand 23 lie on the moving surface as waves, occasionally, due to the random deposition of the strand 23 in the package 46 or due to vagrant air currents, the strand 23 falls in the form of a loop, for example that indicated by the reference number 55. In- Figs. 6 and 7 it also will be seen that the starting end of the strand 23 (indicated by the number 56) is at the outside of the annular mass of strands and the finishing end of the strand 23 (indicated by the number 57) is at the inside of the annular mass of strands.

After a sufficient mass of strands has been laid on the previously accumulated mass of strands so that the annular space within the rims of the package 46 is substantially filled, the operator disengages the dog 50 and by rotating the hand wheel 53 rotates the spider 31 in a counterclockwise direction (Fig. 1) moving the filled package to the left-hand position indicated by the word "Spin" in Fig. 1. In this position the motor 32 continues to be electrically connected and the package 46 continues to rotate at the same rate at which it was filled or, if desired, at a higher rate.

This continued rotation or "Spin" extracts any excessive quantity of lubricant or coating which usually is placed upon the individual fibers 22 at the time of their passage over the accumulating roller 24. Most glass fiber strands are coated with one of a number of substances for the purpose of lubricating the strands from each other, or providing for subsequent fusing of the coating, for example a synthetic resin, or for other reasons. The spinning of the packed package centrifugally extracts excessive coating material from the strand forcing it outwardly between the relatively loosely touching flanges 48 of the package 46 and into the guard 33 from which it may be drained, for example through a drainpipe 58 at the lower corner of the guard 33 and thence into an appropriate container. A similar drainpipe 59 may be located at the opposite corner of each of the guards 33 to permit the lubricating, sizing or coating material to drain from the guard 33 as the package is being filled.

After the second package 46 is filled, the operator again rotates the spider 31 in a counterclockwise direction, moving the first package 46 to the lowermost position indicated by the word "Doff" in Fig. 1. When an arm of the spider 31 moves to the lower position, the motor 32 is electrically disconnected and comes to a stop. While the third package is being filled and the second package is spinning to extract excessive coating material, there is more than sufficient time for the operator to turn the actuator 36 releasing the first package 46 from its flange 35 and allowing it to drop downwardly as shown in Fig. 2. The operator then replaces the filled package with an empty package and, when the package then in the "Fill" position is filled, he rotates the spider 31 to swing the new package up into filling position.

The combination of the means for projecting the strand at a high linear rate of speed, i. e., the pulling rollers 25, and the means for moving a surface across its line of flight at a lesser linear speed, i. e., the mechanism supported by the pedestal 29, provides for the accumulation of a continuously produced strand in a dense and compact package easy to handle and in excellent form for subsequent unwinding.

The accumulated mass of strand may be shipped or carried in its package 46 to the point of subsequent use or the package 46 may be removed from the mass of strands and the mass of strands itself (as shown in Figs. 6 and 7) can be covered by a lightweight envelope, for example, of cellophane or other paper-like material and possesses sufficient integrity of its mass to allow it to be handled without injury. In order to further reduce the cost of shipping the strand, the "doughnut" of Fig. 6 may be diametrically collapsed upon itself and then inserted into a relatively small bag for shipment. Upon receipt at a use point, the "doughnut" shape may be reapproximated by opening the mass of strand. Even after such collapse and reopening the strand 23 can be continuously pulled away from the annular mass of strands from either the inside or the outside of the mass or from both sides simultaneously. The random deposition of the strands in waves, loops and swirls ("generally wave form"), results in there being substantially no parallel sections of strand which might adhere to each other or be confused and thus the likelihood of tangles is practically eliminated.

With respect to the apparatus disclosed so far, it will be observed that the axis of rotation of the packages in "Fill" position lies in a vertical plane perpendicular to the parallel vertical planes of the axes of the pulling rollers 25. In Figs. 8 and 9 apparatus is shown in which the axis of rotation of the packages lies in a plane parallel to the planes of the axes of the pulling rollers 25.

In the structure of Figs. 8 and 9 the three-arm spider 31 of Figs. 1 and 2 is replaced by a pair of rotary plates 60 and 61 which are mounted for rotation on a horizontal arbor 62 that is supported by a pair of uprights 63 and 64. The plates 61 and 62 are connected by three cross plates 65 and three cross plates 66 arranged in a generally hexagonal shape. Each of the plates 66 mounts a gear box 67 (Fig. 9) in which is journalled a radially extending shaft 68. A bevel pinion 69 is pinned on the shaft 68 and in mesh with a similar pinion 70 which is pinned on the end of a stub shaft 71 that is in turn journalled in bearings in a secondary gear box 72 to extend parallel to the arbor 62. A shaft driving pulley 73 is pinned or otherwise secured on the rear of each of the shafts 71.

The radially outward end of each of the shafts 68 has a flanged hub 74 on which is secured a rotary tub 75. The tub 75 has a cylindrical side wall 76 near the edge of which there is located an annular re-entrant groove 77 in which a split ring 78 is removably fitted. Each of the gear mounting plates 66 also mounts a drum shaped guard 79 which peripherally surrounds the rotating tub 75, extending axially around its edge and having a return lip 80 which forms an annular groove 81.

As can best be seen by reference to Fig. 9, the inner diameter of the rotating tub 75 is just slightly greater than the outside diameter of the flanges 48 of the two rings 44 and 45 which constitute one of the packages 46. By removing the split ring 78 a package 46 can be placed in or removed from the tub 75.

All of the driving pulleys 73 which are pinned on the individual stub shafts 71 lie in the same driving plane as an idler pulley 82 that is rotatably supported on an arm 83 of the upright 63. The idler pulley 82 and the driving pulleys 73 are all engaged by a driving belt 84 which also is engaged with a pulley 85 of a motor 86. The motor 86 is mounted on a tiltable platform 87 hingedly mounted by a pin 88 on a base plate 89.

Because the driving belt 84 runs on the idler pulley 82 the belt 84 engages the driving pulleys 73 only when their respective rotating tubs 75 are in the upper right or "Fill" position (Fig. 8) and in the lowermost or "Spin" position. That one of the driving pulleys 73 which is in the "Doff" position (upper left, Fig. 8) is not engaged with the driving belt 84 and thus the tub 75 at the "Doff" position does not rotate.

A positioning disk 90 is secured on the arbor 62 near the upright 63 and has three peripheral notches 91 that are engageable by a dog 92 which is pivoted on a pin 93 mounted in ears 94 on the upright 63. The dog 92 is spring biased into engagement with the periphery of the positioning disk 90 and is disengaged from any one of the notches 91 by the action of a time operated solenoid mechanism 95 of conventional design.

The time actuated solenoid mechanism 95 is cycled by the action of the dog 92 dropping into a notch 91 which indicates the arrival of an empty package at the "Fill" position. The timing mechanism holds the solenoid out of circuit for a selected period of sufficient time for the package 46 to be filled with the strand 23. The solenoid actuating mechanism then trips and the solenoid disengages the dog 92 from the notch 91. When the dog 92 is disengaged, the "drag" of the belt 84 on the two driving pulleys 73 with which it is engaged (the packages in the "Fill" and "Spin" positions) causes the entire mechanism to rotate on the arbor 62. This rotation moves the just filled package to the "Spin" position and moves the newly positioned empty package from the "Doff" position to the "Fill" position. In moving from the "Doff" position to the "Fill" position the driving pulley 73 of the empty package 46 engages with the driving belt 84 and somes up to filling speed as it reaches the "Fill" position. Similarly, upon departure from the "Spin" position the driving pulley 73 disengages from the driving belt 84 and its package 46 comes to a stop at the "Doff" position. Changes in belt length caused by disengagement and engagement of the driving pulleys 73 are compensated for by tilting the motor 84 against its weight on the pin 88.

The relationship between the three positions of the packages, i. e., "Fill," "Spin" and "Doff" in the mechanism of Figs. 8 and 9 is the reverse of that pertaining in the mechanism of Figs. 1 and 2. The rotation of the device as a whole in Figs. 8 and 9 is clockwise so that the package moves from the upper right or "Fill" position to the lower position for spinning and after having the excess size or lubricant centrifugally extracted by the spinning step, it is moved to the upper left or "Doff" position where the stationary filled and dried package can be more easily removed and replaced than was possible in the case of the structure of Figs. 1 and 2.

The annular groove 81 formed by the lip 80 of each of the guards 79 prevents the escape of the lubricant, coating or sizing material that is spun out of a package 46 being filled or a package 46 in the "Spin" position. During the filling operation the coating substance sprays off the lip of the rotating tub 75 against the inner surface of the guard 79 and trickles downwardly thereon accumulating in the lower corner of the guard 79 from which it may drain through a drain opening 96 (see Fig. 8). When the package moves to the "Spin" position additional lubricant or coating liquid which is extracted from the package by centrifugal force is caught in the annular groove 80 and drains through drain holes 97 (Fig. 9) therein. The draining lubricant or coating material is caught in suitable receptacles placed on the floor on which the apparatus stands but not shown in the drawings.

The arrangement of the package to be filled in the mechanism of Figs. 8 and 9 with respect to the pulling rollers 25 has several advantages over the arrangement of the modification disclosed in Figs. 1 and 2. In the first place, by rotating the package being filled 90° with respect to the axes of the pulling rollers 25 to put its axis on a plane parallel to the planes of the axes of the rollers 25, the width of the space leading into the package 46 is increased with respect to the plane in which the wave forms commence to generate in the strand 23. The wave forms thus can be of an amplitude approximately twice as great when they can fall into the package as shown in Fig. 8 as they can when they fall into the package shown in Fig. 3 for example. This permits the strand to be so projected that wave forms of greater amplitude deliberately are encouraged and, compensatingly, the speed of rotation of the package 46 may be reduced even lower than the speed at which it must be rotated in the mechanism of Figs. 1 and 2. The greater amplitude of the wave forms generated in the strand 23 may be accomplished either by increasing the distance between the pulling rollers 25 and the package 46 in "Fill" position or wave forms in the strand 23 may deliberately be created by modifying the peripheral shape of the pulling rollers, for example, as shown on the pulling rollers 98 in Fig. 11.

In Fig. 11 pulling rollers 98 have rim elements 99 which have a plurality of slots 100. The edges of the rim elements 99 between the slots 100 are notched with axially extending grooves 101. The two pulling rollers 98 are adjusted relative to each other so that the slots 100 and grooves 101 of the two rollers are "out of phase." As the strand 23 passes between the perimeters of the rollers 98 it is sharply kinked by being forced into the grooves 101, for example, as indicated by the reference character 101a in Fig. 11, which creates a wave form of small amplitude and wave length but which is sufficient to increase the resistance of the air to the passage of the strand 23 therethrough and thus to cause it to be more rapidly deflected into wave forms of greater amplitude than is the case where the original wave is not impressed on the strand 23 as it passes between the pulling rollers.

In Fig. 10 a mass of strands 102 is shown in side elevation as packaged on the embodiment of the invention illustrated in Figs. 8 and 9. The exterior or first layer of strands deposited in one of the packages 46 is shown in greatly enlarged size on the exterior of the mass 102 to illustrate the relative relationship between the loops, swirls and other wave forms in which the strand falls. Observing the mass 102 of Fig. 10 progressively from right to left it can be seen that previously laid loops, for example those indicated generally by the reference number 103, are at least partially exterior of the loops indicated by the reference character 104 and those in turn are located exteriorly of the wave forms indicated by the reference character 105. The loops and wave forms deposited in the package 46 by the mechanism of Figs. 8 and 9 are not as regular as those drawn in Fig. 10 and include many swirls and loops, for example as indicated by the reference number 106. The spacing of the wave forms, loops and swirls is entirely random and is controlled only generally by the relative linear movement of the strand 23 when it strikes the inside of the package 46 and the package 46 itself.

With respect to the appearance of the packages of strands produced by operation of the apparatus embodying the invention and disclosed therein, no limitations as to the meaning of the term "generally wave form" are to be derived from the drawings, it being impossible to accurately illustrate the shapes assumed by the generally wave form strand layers either in the passage of the strand through the air or in its deposition upon and in the package 46. Even were it possible to correctly draw a particular package produced by the mechanism embodying the invention, this particular package would only generally illustrate other packages because not only is no attempt made to control the fall of the strands with any degree of particularity but indeed the random fall is desirable since it insures an evenly laid up package with the strands spread widely across the receiving surface and the likelihood of adherence between sections of different portions of the strand substantially eliminated. To the eye of the casual observer, there is no difference in the appearance of a package accumulated by the operation of mechanism of either modification of the invention, whether packed with the package axis in a plane parallel to or perpendicular to, the planes of the pulling roller axes. The strands being packed are of such relatively fine diameters and so tightly compacted in random swirls, waves and loops that only upon careful "unwinding" can the precise form of the strand layers be observed.

The particular relationship between the axes of the package and the pulling rollers is not, therefore, critical and both arrangements are included within the concept of the instant invention.

We claim:

1. Apparatus for packaging a continuous strand comprising, in combination, rotary means for projecting said strand longitudinally across an open air space, a package having a generally cylindrical surface, and mechanism for so rotating said package on its axis and with its surface moving at a linear speed less than that of said strand in position to be impinged upon by said projected strand as to apply a continuous force to said strand after impingement upon said surface for compacting said strand thereon.

2. Apparatus for packaging a continuously generated strand comprising, in combination, a high speed rotary mechanism for linearly projecting said strand across an open air space at a certain linear speed an annular package having a generally cylindrical inner surface and means for rotating said package on its axis with such cylindrical surface extending across the line of movement of said strand and in line to receive said strand on such rotating surface, at a speed such that the linear speed of such surface is less than the linear speed of projection of said strand.

3. Apparatus for packaging a continuous strand that comprises, in combination, a pair of pulling rollers having opposed peripheral engagement with said strand for projecting said strand across an open air space at a certain linear speed and along a generally straight path, an annular package having an axial opening of certain diameter and a cylindrical inner surface of diameter greater than such opening, means for mounting said package with its axis inclined to such path for rotation on such axis and in position whereby said strand enters the axial opening therein and impinges upon said inner surface and means for rotating said package with a linear surface speed less than the linear speed of projection of said strand.

4. Apparatus for packaging a continuous strand in compact, spirally arranged wave form layers comprising, in combination, means for projecting said strand across an open air space on a generally straight path, a rotary spindle with its axis inclined relative to and intersecting such path, means on said spindle for removably mounting an annular package having an axial opening and a generally cylindrical inner wall with said wall extending across the path of travel of said strand and means for rotating said spindle at a speed selected to produce a linear speed of said wall less than the linear speed of projection of said strand.

5. Apparatus for packaging a continuous strand in compact, spirally arranged wave form layers comprising, in combination, means for projecting said strand across an open air space on a generally straight path, a rotary spindle, a movable frame for mounting said spindle in a position with its axis inclined relative to and intersecting such path, means for mounting said frame for movement of said spindle between such position and at least one other position away from such path, means on said spindle for removably mounting an annular package having an axial opening and a generally cylindrical inner wall with said wall extending across the path of travel of said strand and means for rotating said spindle at a speed selected to produce a linear speed of said wall less than the linear speed of projection of said strand.

6. Apparatus for packaging a continuous strand in compact, spirally arranged wave form layers comprising, in combination, means for projecting said strand across an open air space on a generally straight path, a rotary spindle, a movable frame for mounting said spindle in a position with its axis inclined relative to and intersecting such path, at least one additional similar spindle mounted complementarily in said frame, means for mounting said frame for movement of said spindles alternately into and out of said position, means on each of said spindles for removably mounting an annular package having an axial opening and a generally cylindrical inner wall with said wall extending across the path of travel of said strand and means for rotating said spindles at least while in such position at a speed selected to produce a linear speed of said wall less than the linear speed of projection of said strand.

7. Apparatus for packaging a continuous strand that is linearly projected across an open air space comprising, in combination, a rotatable frame, at least two spindles rotatably mounted in said frame and successively positionable thereby with their axes inclined to and intersecting the path of movement of said strand across the air space, means for mounting an annular package having an axial opening and a generally cylindrical wall on each of said spindles with its axial opening in line to receive said strand for impingement on its inner surface, means for rotating each of said spindles at least while in such path intersecting position and means for rotating said frame to move a package on one of said spindles into and out of such strand receiving position.

8. Apparatus for packaging a continuous strand that is linearly projected across an open air space comprising, in combination, a rotatable frame, at least two spindles rotatably mounted in said frame and extending outwardly therefrom, means for positioning said frame with each of said spindles successively extending with its axis inclined to and intersecting the path of travel of said strand, means for mounting an annular package having an axial opening and a generally cylindrical wall on each of said spindles with its axial opening in line to receive said strand for impingement on its inner surface, means for rotating each of said spindles at least while in such path intersecting position and means for rotating said frame to move a package on one of said spindles into and out of such strand receiving position.

References Cited in the file of this patent

UNITED STATES PATENTS

| 2,115,423 | Korver | Apr. 26, 1938 |

FOREIGN PATENTS

| 420,085 | France | Nov. 14, 1910 |
| 525,283 | Great Britain | Aug. 26, 1940 |